3,063,809
PROCESS FOR MAKING BORON HYDRIDES
Earl L. Muetterties, Chadds Ford, Pa., assignor to E. I. du Pont de Nemours and Company, Wilmington, Del., a corporation of Delaware
No Drawing. Filed June 3, 1957, Ser. No. 662,997
4 Claims. (Cl. 23—204)

This invention relates to boron hydrides and more particularly to a new and improved method for making diborane and higher boron hydrides.

Diborane, a basic chemical in boron chemistry, is useful in a wide variety of applications. Almost every boron compound of importance can be directly obtained from it. Diborane can be pyrolyzed under controlled conditions to form boron or boride coatings on metals or ceramics. It is also useful as a high energy fuel.

Several methods for preparing diborane and other boron hydrides have been disclosed heretofore. However, these older methods possess certain deficiencies. Some, for example, give poor yields of diborane, and others require the use of expensive or relatively unavailable starting materials. Recently several new methods of making diborane have been proposed which use more readily available starting materials. One such method is fully described and claimed in my copending U.S. application Serial No. 618,196, filed October 25, 1956, now abandoned, and involves hydrogenating boron trichloride at 80–250° C. under a pressure of at least 50 atmospheres in the presence of aluminum.

In view of the potential importance of diborane, this invention has as an object an alternative method for preparing diborane and higher boron hydrides using raw materials not employed by prior art processes. A further object is provision of a novel method for preparing diborane from raw materials potentially available on a commercial scale. Still another object is provision of a novel method for preparing diborane and higher boron hydrides free of contamination by diborane monochloride, an undesirable by-product in the older-known methods. Other objects will appear hereinafter.

These objects are accomplished in accordance with the present invention by a process which comprises treating a reactant consisting essentially of alkylborine with hydrogen at a temperature of from 130° to 500° C. under a pressure of at least 50 atmospheres and in the presence of a hydrogenation catalyst consisting of aluminum metal in a discontinuous, or particulate, form, and isolating from the reaction mixture diborane and higher boron hydrides.

The process is conveniently carried out by charging a corrosion-resistant reaction vessel, for example, a stainless steel-lined vessel capable of withstanding the particular operating pressure selected, with a reactant consisting essentially of a trialkylborine, such as, for instance, tri-n-butylborine, and a hydrogenation catalyst consisting of aluminum metal, e.g., aluminum powder. The amount of catalyst can range from 0.1–5% of the trialkylborine reactant. The reaction vessel is then closed and sufficient hydrogen is introduced to produce a pressure of at least 50 atmospheres and preferably 100–1000 atmospheres at the operating temperature. The reaction mixture is then heated to a temperature between 130–500° C., preferably at 130–160° C. with the pressure maintained at the selected value for the duration of the reaction. The reaction mixture is heated at the preferred reaction temperature for periods of time ranging up to about 10 hours.

The exact time for heating the mixture is, of course, dependent on the particular reaction temperature employed. At reaction temperatures of 130–250° C. reaction times of 1 minute to several hours can be used, whereas at the higher temperatures, that is, temperatures of 250–500° C., shorter times are desirable, for example, from one second to several minutes. At the higher temperatures the longer times of reaction reduce the yields of diborane and other volatile boron hydrides. Consequently, at the highest temperatures in the operable range, the shortest reaction times are employed.

After the hydrogenation is completed, the reaction vessel is cooled to room temperature (20–30° C.) and gaseous reaction products are carefully bled through a trap cooled to a low temperature, e.g., by means of liquid nitrogen, in order to recover condensable gases. The diborane, higher volatile boron hydrides, e.g., pentaborane, and other condensable gases formed can be isolated from the cold trap by conventional means, e.g., by fractional distillation. The composition of the condensable gases can be determined readily by means of the mass spectrometer.

The process of this invention is also capable of being carried out continuously by passing the alkylborine through a reactor containing the granular or pelleted aluminum hydrogenation catalyst heated to the desired temperature and maintained at a pressure of at least 50 atmospheres. In this embodiment, much shorter reaction times can be employed and it is actually preferred to use reaction times of as little as one second to one minute with the higher reaction temperatures specified previously.

The alkylborines used in the process of this invention can be of the grades commercially available. The hydrogen should be oxygen-free.

As indicated above, the hydrogenation catalyst used in the process of the invention is aluminum metal in a discontinuous form, e.g., in the form of a powder, granules, pellets, and the like.

The value of the hydrogenation catalyst in the process of this invention is shown by the fact that alkylborines heated to temperatures up to 180° C. under hydrogen at pressures up to 1000 atmospheres in the absence of such catalyst do not yield diborane.

The following example, in which the proportions of ingredients are expressed in parts by weight, illustrates the process of this invention in further detail.

Example I

A stainless steel-lined pressure vessel is charged with 0.5 part of aluminum dust, 25 parts of tri-n-butylborine, and sufficient hydrogen to maintain a pressure of 500 atmospheres at 130° C. The vessel is then heated to 130° C. for a period of 4 hours. The reaction vessel is then cooled to room temperature (about 25° C.) and the gaseous products are bled through a liquid nitrogen trap where 0.5 part of condensable gas is recovered. Analysis of this gaseous product by means of the mass spectrometer shows that the gas consists of 81–85% diborane and 7–7.5% hydrogen. Small amounts of hydrocarbons are also present.

This invention has been illustrated by an example with particular reference to the hydrogenation of certain alkylborines. However, the process is applicable to any trialkylborine. Trialkylborines in which the alkyl groups contain from 1 to 8 carbon atoms are especially preferred since they are more readily available. Examples of specific alkylborines that are operable include, among others, trimethyl, triethyl, tri-n-propyl, tri-n-butyl, triisobutyl, tri-n-amyl, tri-n-hexyl, and tri-n-octyl borines.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A process of preparing diborane and higher boron hydrides which comprises the steps of reacting an alkylborine with hydrogen at a temperature within the range of 130 to 500° C. and under a pressure of at least 50 atmospheres and in the presence of a hydrogenation catalyst consisting of aluminum metal, and isolating diborane and higher boron hydrides so produced from the reaction mixture.

2. Process of claim 1 wherein the reaction between the alkylborine reactant and hydrogen is carried out in the presence of from 0.1 to 5% by weight, based on the alkylborine, of the aluminum hydrogenation catalyst.

3. A method for preparing diborane which comprises heating a trialkylborine at a temperature of 130–160° C. and under a pressure of 100–1000 atmospheres in presence of hydrogen and a hydrogenation catalyst consisting of aluminum metal, said catalyst being present in an amount ranging from 0.1 to 5% of the trialkylborine reactant, and isolating the resulting diborane from the reaction mixture.

4. A continuous process for producing diborane and higher boron hydrides which comprises passing a trialkylborine and hydrogen through a reactor containing a hydrogenation catalyst consisting of aluminum metal, said catalyst being heated to a temperature within the range of 130 to 500° C. under a hydrogen pressure of at least 50 atmospheres, and isolating therefrom the resulting diborane and higher boron hydrides.

References Cited in the file of this patent

UNITED STATES PATENTS

| | | |
|---|---|---|
| 2,596,690 | Hurd | May 13, 1952 |
| 2,729,540 | Fisher | Jan. 3, 1956 |
| 2,744,810 | Jackson | May 8, 1956 |
| 2,875,028 | Winternitz | Feb. 24, 1959 |
| 2,946,664 | Klein et al | July 26, 1960 |

OTHER REFERENCES

Babor et al.: "General College Chemistry," 1940, pp. 132–133.

Taylor: "Inorganic and Theoretical Chemistry," 9th edition, 1952, pp. 148–149.

Ehret: "Smith's College Chemistry," 6th edition, 1946, pp. 177–179.

Finholt et al.: "Journal of the American Chemical Society," vol. 69, pp. 1199–1203 (May 1947).

Koster: "Angewandte Chemie," vol. 69, p. 94 (Feb. 7, 1957).

Koster: "Angewandte Chemie," vol. 68, p. 383 (June 7, 1956).

Hurd: "Journal of the American Chemical Society," vol. 71, pp. 20–22 (1949).